Feb. 17, 1942.  H. E. SOMES  2,273,423
ELECTRICALLY HEATED ROLL
Filed June 23, 1939

Inventor
HOWARD E. SOMES,
Attorney

Patented Feb. 17, 1942

2,273,423

UNITED STATES PATENT OFFICE 2,273,423

ELECTRICALLY HEATED ROLL

Howard E. Somes, Detroit, Mich., assignor to Budd Induction Heating, Inc., Philadelphia, Pa., a corporation of Michigan Application June 23, 1939, Serial No. 280,798

4 Claims. (Cl. 219—13)

The present invention relates to heated machine rolls, and particularly to a machine roll structure capable of being heated by electromagnetic induction.

Among the objects of the invention are: to provide a machine roll capable of being heated during operation without interference with normal operation and without interference with free access to any part of the working surface of the roll; to effect by electromagnetic induction a symmetrical heating of the roll with consequent avoidance of unsymmetrical stresses; to effect the heating from the inside of the roll, applying substantially all the heat energy to the working portion of the roll, with minimum generation of heat in the supporting structure and minimum transfer of heat from the roll to the supporting structure; to effect heating of the roll by a flow of heating current therethrough without substantial potential gradient axially of the roll and without substantial current flow between rolls where two rolls are used; and to effect such heating with economy in expenditure of electrical energy.

The above objects of the invention are attained by the provision of a hollow thick walled roll structure surrounding an inducing coil arranged to induce in the roll annular heating currents distributed symmetrically of the roll axis, the coil being provided with a radially laminated core arranged to guide substantially the entire flux through the roll and shield the inner and supporting structure and bearings from the flux. Means are provided also for retarding exchange of heat between the roll and the coil and core, and other parts such as the supporting structure.

Other objects and advantages of the invention will appear upon a perusal of the following specification and accompanying drawing constituting a detailed disclosure of a preferred embodiment of the invention.

Figure 2:
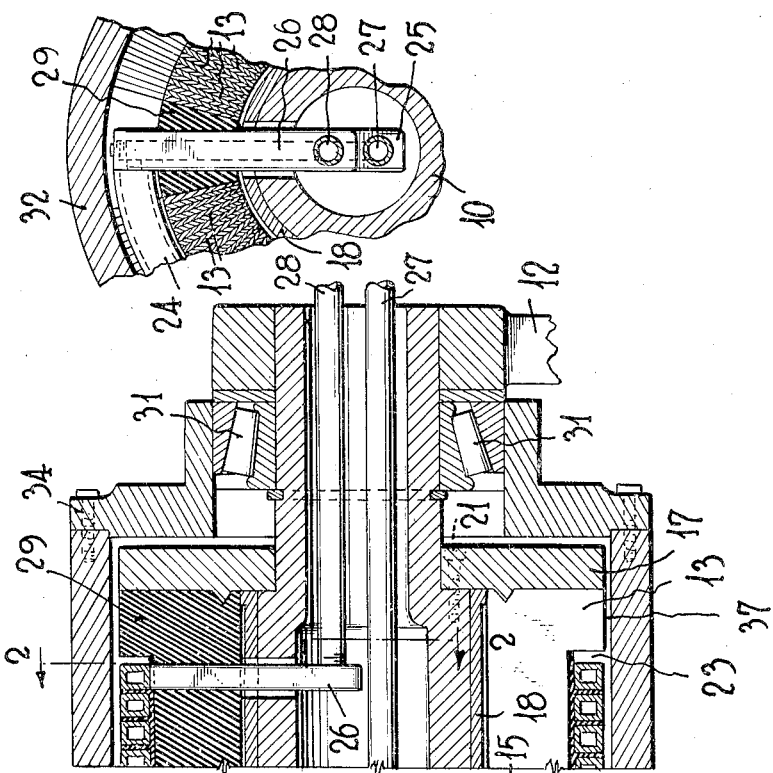
Fig. 2 is a section on the line 2—2 of Fig. 1.
Figure 1:
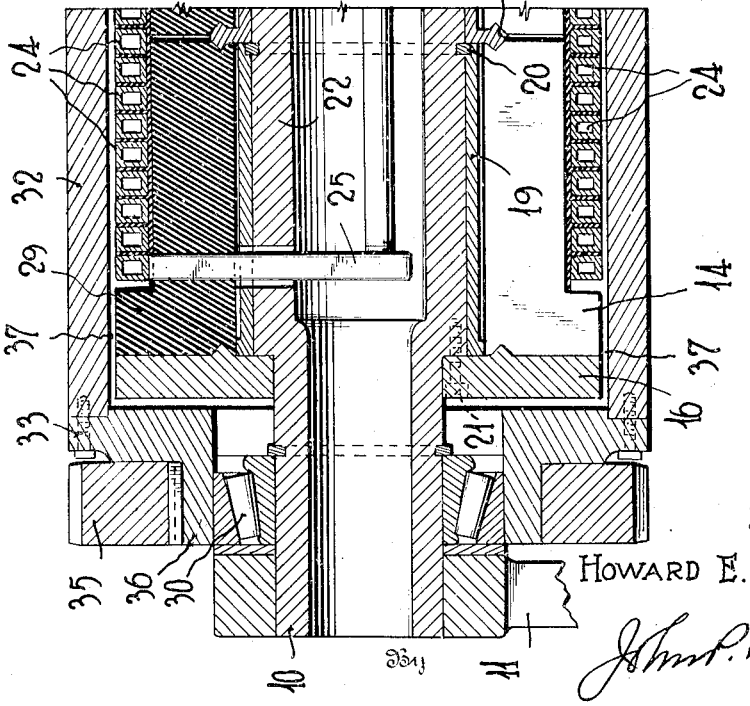
Fig. 1 is an axial section through a roll constructed according to the invention.

Referring to the drawing in detail, the complete roll structure including its bearings and the heating means, is mounted on a main, stationary, hollow cylindrical supporting member 10, supported at its ends in frame members 11 and 12 forming part of the frame of a rolling, calendering or other machine in which the roller is to be used. Mounted about the main supporting member 10 is a cylindrical core element 13 built up of radial laminations 14 clamped in position between a central clamp-ring element 15, and end clamping rings 16 an 17. The central clamp-ring 15 is carried on a spacing sleeve 18 which with the spacing sleeve 19 is fitted about the supporting member 10 and held against axial displacement by the central lock ring 20 and end clamping rings 16 and 17, the latter being held in clamping engagement with the ends of the laminations by cap screws 21 threaded into the shouldered ends of the radially enlarged central portion 22 of the hollow support 10. Mounted within a central outer recess 23 in the core element 13, is an inducing coil 24 of fluid conducting tubing of electrical conducting material such as copper, having its convolutions suitably insulated from each other and from the core element and its terminals secured for fluid and electrical connection with tubular, electrical conducting terminal extensions 25—26, extending radially into the hollow of the supporting member 10. From the inner ends of the terminal extensions 25—26, electrical and fluid conduction is extended through and out of the hollow of the supporting member 10 through tubular conductors 27—28 to suitable sources of alternating current and cooling fluid not shown.

Insulation of the terminal extensions 25—26 from the laminated core element 13 is provided by the radially tapered insulating block 29 through which the extensions pass to the interior of the supporting member 10 and from which later and the spacing sleeves they are air insulated by the clearance between them and the openings through which they pass. Where desired, suitable bushings of insulating material may be provided for such clearance spaces.

Rotatably mounted about the main supporting member on roller-bearing assemblages 30—31, is a hollow, thick walled, roll element 32, secured between end plates 33—34 and supported by them on the outer or movable portion of the roller-bearing assemblages 30—31 respectively. The roll is arranged to be driven by means of a driving gear 35 keyed on the cylindrical extension 36 of the end plate 33.

Construction of the laminated core element and insulating block 29 in two parts separated transversely of the axis as shown, permits the use of a pre-formed coil or winding for the inducing coil 24. The coil 24 after assembly with the core element may be joined at its terminals to the outer ends of the terminal extensions 25—26 in any known or other suitable manner as by brazing or welding, the terminal extensions having been previously shoved radially into place through openings in the insulating block 29.

It will be noted that the hollow cylindrical core element 13 extending between the inducing coil 24 and the inner supporting structure, and out over the ends of the coil into close proximity to the roll element 32, forms a magnetic shielding element between the entire inducing coil and the supporting structure, with the result that there is substantially no heat generated directly in the supporting structure. It will also be noted that the air gap 37 between the roll element 32 and the inducing assembly of coil, core and clamping plates 16—17, places a body of insulating material between the roll element 32 and the inducing assembly and supporting structure, constituting means retarding the transfer of heat from the roller element to the inducing assembly and supporting structure.

By mounting the inducing assemblage on a stationary support within the hollow roll element the use of slip rings for effecting electrical connection and complicated stuffing-box structures for effecting fluid connection is avoided, and heating may proceed without interference with normal operation of the roll and without interference with free access to any part of the working surface of the roll. The arrangement of the core element to extend through and around over the ends of the inducing coil into close proximity to the roll element operates to concentrate substantially the entire electromagnetic flux return path in the roll element thus applying substantially all the generated heat to the working portion of the roll, while the arrangement of the inducing coil and core coaxial with the roll element, operates to induce annular heating currents in the roll distributed symmetrically of the roll axis with the result that there is substantially no potential gradient axially of the roll and consequently substantially no tendency to produce a flow of current between points spaced axially of the roll or between rolls where two rolls are used. This minimizes any tendency to electrolytic erosion. The air space between the inner and outer bearing-race members of the roller-bearing assemblages 30—31 and the reduced area of direct metallic contact between them afforded by the roller elements of the bearing assemblages provides further means for retarding the conduction of heat from the roll element 32 to the supporting structure. Where desired, the roller bearing assemblages may be ventilated in any known or other suitable manner.

While I have herein shown and described one specific embodiment of the invention for the sake of disclosure, it is to be understood that the invention is not limited to such specific embodiment, but contemplates all such variants thereof as fall fairly within the scope of the appended claims.

What I claim is:

1. An electrically heated roll structure comprising a support, a magnetic core element surrounding the support, a stationary inducing winding surrounding the core element wholly outside the core element, and a hollow rotatable roll surrounding the winding and coaxial therewith.

2. An electrically heated roll structure comprising a stationary support, an inducing element carried by the support, a hollow roll element surrounding said inducing element in inductive relation therewith and rotatably mounted on said support, and a magnetic shielding element between the entire inducing winding and the support adapted to direct the flux of the inducing element radially to the roll.

3. An electrically heated roll structure comprising a pair of stationary frame elements, a stationary supporting element extending between said frame elements and secured thereto, a stationary induction heating assemblage mounted on said supporting element, said assemblage including a coil coaxial with said support and an annular core composed of axially radially extending laminations surrounding said support and within the coil, and a hollow roll element surrounding said heating assemblage and mounted to rotate thereabout on bearings carried by the supporting element one at each end of the heating element between the heating element and the frame element.

4. An electrically heated roll structure comprising a hollow tubular support, a stationary induction heating assemblage mounted about said support, said assemblage including a coil coaxial with said support and an annular core composed of axially radially extending laminations surrounding said support and within the coil, a hollow roll element surrounding said heating element in inductive relation therewith and mounted to rotate on hollow-ring shaped bearing assemblages situated at each end of the heating assemblage coaxial with said tubular support, and a pair of stationary conductor elements leading from the heating assemblage through the hollow of the tubular support and through the hollow of one of the ring-shaped bearings.

HOWARD E. SOMES.